United States Patent
Müller et al.

(10) Patent No.: US 10,146,432 B2
(45) Date of Patent: Dec. 4, 2018

(54) METHOD FOR OPERATING AN OPERATOR CONTROL DEVICE OF A MOTOR VEHICLE IN DIFFERENT OPERATOR CONTROL MODES, OPERATOR CONTROL DEVICE AND MOTOR VEHICLE

(71) Applicant: AUDI AG, Ingolstadt (DE)

(72) Inventors: Ulrich Müller, Ingolstadt (DE); Michael Wachinger, Winkelhausen (DE); Tim Krämer, Eitensheim (DE)

(73) Assignee: AUDI AG, Ingolstadt (DE)

( * ) Notice: Subject to any disclaimer, the term of this patent is extended or adjusted under 35 U.S.C. 154(b) by 0 days.

(21) Appl. No.: 15/537,285

(22) PCT Filed: Oct. 31, 2015

(86) PCT No.: PCT/EP2015/002193
§ 371 (c)(1),
(2) Date: Jun. 16, 2017

(87) PCT Pub. No.: WO2016/096066
PCT Pub. Date: Jun. 23, 2016

(65) Prior Publication Data
US 2018/0134158 A1   May 17, 2018

(30) Foreign Application Priority Data
Dec. 18, 2014 (DE) ........................ 10 2014 019 005

(51) Int. Cl.
| | |
|---|---|
| *G06F 3/0488* | (2013.01) |
| *B60K 35/00* | (2006.01) |
| *G06F 3/041* | (2006.01) |
| *G06F 3/01* | (2006.01) |

(52) U.S. Cl.
CPC .......... *G06F 3/04886* (2013.01); *B60K 35/00* (2013.01); *G06F 3/017* (2013.01);
(Continued)

(58) Field of Classification Search
CPC . G06F 3/0488–3/04886; G06F 3/041–3/0418; G06F 2203/04104;
(Continued)

(56) References Cited

U.S. PATENT DOCUMENTS

2010/0318573 A1* 12/2010 Yoshikoshi ......... G06F 3/04883
707/802
2011/0248948 A1   10/2011 Griffin et al.
(Continued)

FOREIGN PATENT DOCUMENTS

| | | |
|---|---|---|
| DE | 102011109259 A1 | 2/2013 |
| DE | 102011119746 A1 | 6/2013 |

(Continued)

OTHER PUBLICATIONS

German Office Action for German Application No. 2014019005.6 dated Aug. 17, 2016.
(Continued)

*Primary Examiner* — David Tung
(74) *Attorney, Agent, or Firm* — Staas & Halsey LLP (57) ABSTRACT

A touchpad detects a duration of a touch by an object at a current position and/or a distance traversed by the object. An operator control mode is predefined as a function of the duration and/or the distance. A pressure threshold value is predefined as a function of the operator control mode. The pressure applied to the touchpad is detected and if higher than the predefined pressure threshold value, a function of the motor vehicle which is assigned to the current position is triggered.

6 Claims, 3 Drawing Sheets

(52) U.S. Cl.
CPC ........ *G06F 3/0414* (2013.01); *G06F 3/04883* (2013.01); *B60K 2350/1012* (2013.01); *B60K 2350/1028* (2013.01); *G06F 2203/04104* (2013.01); *G06F 2203/04105* (2013.01)

(58) Field of Classification Search
CPC .......... G06F 2203/04105; B60K 35/00; B60K 2350/1012; B60K 2350/1028
See application file for complete search history.

(56) References Cited

U.S. PATENT DOCUMENTS

| | | |
|---|---|---|
| 2011/0304550 A1 | 12/2011 | Romera Jolliff et al. |
| 2013/0063389 A1 | 3/2013 | Moore |
| 2013/0275130 A1* | 10/2013 | Nada ..................... G10L 15/265 704/235 |
| 2014/0043259 A1 | 2/2014 | Park |
| 2014/0055367 A1* | 2/2014 | Dearman .............. G06F 3/0488 345/173 |

FOREIGN PATENT DOCUMENTS

| | | |
|---|---|---|
| DE | 102014019005.6 | 12/2014 |
| WO | PCT/EP2015/002193 | 10/2015 |

OTHER PUBLICATIONS

International Search Report for PCT/EP2015/002193 dated Feb. 12, 2016.

* cited by examiner

METHOD FOR OPERATING AN OPERATOR CONTROL DEVICE OF A MOTOR VEHICLE IN DIFFERENT OPERATOR CONTROL MODES, OPERATOR CONTROL DEVICE AND MOTOR VEHICLE

CROSS REFERENCE TO RELATED APPLICATIONS

This application is the U.S. national stage of International Application No. PCT/EP2015/002193, filed Oct. 31, 2015 and claims the benefit thereof. The International Application claims the benefit of German Application No. 10 2014 019 005.6 filed on Dec. 18, 2014, both applications are incorporated by reference herein in their entirety.

BACKGROUND

Described below are a method for operating an operator control device of a motor vehicle, an operator control device and a motor vehicle.

Touch-sensitive operator control units or touchpads are already known from the related art and are used, for example, in laptops to control or select functions of the laptop. Therefore, the touchpad can determine a position of a finger with which a user touches the touchpad, and therefore permit interaction with a screen content of the laptop. For this purpose, for example, a mouse cursor can be controlled on the screen by the user touching the touchpad with his finger. In US 2011/0304550 A1 an operator control unit is described which is configured to make available a plurality of input modes, for example an input with a finger or an input pin, and to adapt a configuration of the operator control unit to the instantaneous input method.

Such touchpads are also being increasingly used in motor vehicles so that a user, for example the driver of the motor vehicle, can control functions of the motor vehicle, for example infotainment components, a navigation system or a telephone. These functions can be controlled, for example, by pressing the touchpad directly or by sweeping over the touchpad. In this context, deviations between the desired input and activated input may occur if the driver is, for example, concentrating on driving the motor vehicle during the journey and inadvertently presses the touchpad.

It is also known from the related art to combine touchpads with a force sensor system which determines the force of a user's finger, that is to say a pressure, which the user applies to the touchpad with his finger. By detecting the pressure, it is possible to trigger a function by an activation force or an activation pressure. This means that the user can choose a function, for example, by sliding over the touchpad and can select the function by pressing. Therefore, the behavior of a known mechanical key can be simulated. The respective function is triggered only when pressure is applied to the touchpad. In order to improve further the subjective quality impression in the case of activation, a mechanical haptic impulse, for example a vibration, can be generated by an actuator. In addition, a sound, for example a clicking noise, can also be generated by a loudspeaker in the case of an activation. As a result, when activation occurs the touchpad feels virtually like a mechanical key.

Furthermore, touch-sensitive screens or touchscreens are known from the related art. Such touchscreens are provided in for example in tablets which are known per se in order to control a program sequence of the tablet by touching parts of the screen, for example with a finger. In this respect, US 2014/0043259 A1 presents an electronic device with a touchpad and a touchscreen. In this context, the sensitivity of the touchpad is changed as a function of whether the electronic device is used as a laptop or as a tablet.

SUMMARY

The method described below provides more reliable operator control of an operator control device and by which incorrect operator control operations can be avoided.

The method serves to operate an operator control device of a motor vehicle. The method includes detecting a duration over which a touch-sensitive operator control unit is touched by an object and/or detecting a distance which is traversed by the object when the touch-sensitive operator control unit is touched. Furthermore, the method includes predefining an operator control mode as a function of the detected duration and/or the detected distance, predefining a pressure threshold value as a function of the predefined operator control mode, and detecting a current position at which the touch-sensitive operator control unit which is operated in the predefined operator control mode is touched by the object, and detecting a pressure which is applied to the touch-sensitive operator control unit by touching the touch-sensitive operator control unit. Furthermore, the method includes determining whether the detected pressure is higher than the predefined pressure threshold value, and triggering a function of the motor vehicle which is assigned to the detected current position, exclusively if the detected pressure is higher than the predefined pressure threshold value.

Functions of the motor vehicle, for example infotainment functions of the motor vehicle, can be selected and/or triggered and/or controlled by a user, in particular the driver of the motor vehicle, via the operator control device. The operator control device has a touch-sensitive operator control unit which can be configured, for example, as a touch-sensitive area or as a touchpad and which can implement touch sensitivity by functional principles which are known per se.

The touch-sensitive operator control unit is configured to determine how long the touch-sensitive operator control unit is touched by the object and how far the object is moved on the touch-sensitive operator control unit. In order to detect the distance, a position of the object on the touch-sensitive operator control unit can, for example, be detected continuously. The object is, in particular, a finger of a hand with which the user operates the operator control device. If the user sweeps, for example with the object, over the touch-sensitive operator control unit, the object traverses a certain distance over the touch-sensitive operator control unit and remains on the touch-sensitive operator control unit for a certain duration. It may also be the case that the user, for example, touches the touch-sensitive operator control unit with the object only in a punctiform fashion. In this context, the object does not traverse any distance on the touch-sensitive operator control unit and, under certain circumstances, remains only briefly on the touch-sensitive operator control unit. A current operator control mode of the operator control device is defined on the basis of the detected duration and/or the detected distance.

Furthermore, the touch-sensitive operator control unit detects the current position of the object on the touch-sensitive operator control unit. Furthermore, a pressure which the object exerts on the touch-sensitive operator control unit is detected, for example by a pressure sensor. The function which is assigned to the determined position is triggered only when the detected pressure exceeds a predefined pressure threshold value, that is to say when the applied pressure is higher than the predefined pressure threshold value. The predefined pressure threshold value can also be referred to as a triggering threshold. In order to trigger the function there is therefore provision that the user applies a pressure or a triggering pressure to the touch-sensitive operator control unit, which pressure or triggering pressure exceeds the triggering threshold. This predefined pressure threshold value is changed or varied as a function of the operator control mode, that is to say as a function of the detected distance and/or the detected duration.

Various interaction possibilities with the operator control device are therefore made available to the user. It is therefore possible to make available to the user, for example in an operating control mode, only pressure functions in which the user triggers the function assigned to a specific position by touching the touch-sensitive operator control unit in a punctiform fashion at the position and by pressing the specific position with a pressure higher than the pressure threshold value of this operator control mode. In another operator control mode, the user can interact, for example, with a screen content of a screen of the motor vehicle by sweeping over the touch-sensitive operator control unit, during which process the object applies a pressure to the touch-sensitive operator control unit which is lower than the pressure threshold value of this other operator control mode, and the user can trigger functions represented there, for example by pressing with a pressure which is higher than the pressure threshold value of this other operator control mode.

In order therefore to guarantee that by pressing the operator control unit a function which is assigned to the current position is triggered only when this is actually desired by the user, the pressure threshold value is adapted to the respective operator control mode. Therefore, it is possible to prevent, in particular, that undesired functions are triggered inadvertently, for example by unintentional pressing during the sweeping over. Thus, the driver can therefore operate the operator control device easily and without errors.

There can be provision that a first pressure value is predefined as the pressure threshold value if the detected duration undershoots a predetermined duration and/or the detected distance undershoots a predetermined distance, and a second pressure value is predefined as the pressure threshold value if it is detected that the detected duration corresponds at least to the predetermined duration and/or the detected distance corresponds at least to the predetermined distance, wherein the first pressure value is smaller than the second pressure value. In particular there is provision here that the first pressure value is predefined in a first operator control mode if the driver touches the touch-sensitive operator control unit with the object essentially only in a punctiform fashion at a specific position and at the same time presses in order to trigger a function assigned to the position. In other words, this means that the first pressure value is predefined if it is detected that the object essentially does not traverse any distance at all on the touch-sensitive operator control unit and/or touches the touch-sensitive operator control unit only briefly. When the first pressure value is predefined, that is to say in the first operator control mode, it is assumed that the user would like to consciously select the assigned function by punctiform touching and pressing of the position. Therefore, the first pressure value can be selected in such a way that the user can quickly and easily trigger the function. The first pressure value can be, for example, approximately 3 N.

The second pressure value is predefined in a second operator control mode if it is detected that the user sweeps over the touch-sensitive operator control unit with the object. In other words, this means that the second pressure value is predefined as soon as it is detected that the object traverses a distance on the touch-sensitive operator control unit and/or remains on the touch-sensitive operator control unit over a relatively long time period. In order to prevent a function being triggered during the sweeping over if the user inadvertently presses during the sweeping over, the pressure threshold value is raised compared to the first operator control mode. Therefore, the second pressure value is predefined as the pressure threshold value. The second pressure value can be, for example, approximately 5 N. If the user therefore would like to trigger a function by pressing in the second operator control mode, he must apply a higher pressure than in the first operator control mode. In this way, for example, an undesired function can be prevented from being triggered in the second operator control mode by the inadvertent application of a pressure to the touch-sensitive operator control unit, which pressure would have brought about triggering of the function in the first operator control mode. Therefore, incorrect operator control operations can be prevented in a particularly simple and reliable way.

In one development, if it is detected that the touch-sensitive operator control unit is touched only by the object, and the detected duration corresponds at least to the predetermined duration and/or the detected distance corresponds at least to the predetermined distance, a character input mode is predefined as the operator control mode, in which it is detected that the object is made to sweep over the touch-sensitive operator control unit and is assigned to at least one alphanumeric character as a function thereof. Such an alphanumeric character can be, for example, a letter or a number or a symbol. In this character input mode the user can use the object to write, for example, letters onto the touch-sensitive operator control unit, which letters can be detected by the touch-sensitive operator control unit. Therefore, the user can, for example, activate a destination input for a navigation system. During the character input by the user, no key pressure function is usually required. However, in order nevertheless to permit a key pressure function for the user, the second pressure value is specified as the pressure threshold value during the character input mode. The triggering threshold is therefore raised during the character input mode in comparison with an operator control mode in which the user directly selects a position on the touch-sensitive operator control unit by punctiform touching. It is therefore possible to prevent a probably undesired function from being triggered if the user inadvertently applies pressure when inputting a character. Nevertheless, if the user would like to select a function by pressing, he must apply a pressure which is higher than the second pressure value.

The character input mode may be maintained further for a predefined duration after it has been detected that the object is no longer touching the touch-sensitive operator control unit. In other words, this means that the operator control device continues to be operated in the character input mode for the predefined duration if the user removes the object from the touch-sensitive operator control unit, in particular for a brief time. This may occur, for example, if the user briefly stops after writing a letter, in order to start writing a further letter. During the time period between the stopping and the renewed starting, the character input mode is not ended. Since the pressure threshold value is raised during the character input mode, renewed, inadvertently excessively firm, touching of the touch-sensitive operator control unit during the starting of the next letter is not detected as applying pressure at a position and a probably undesired function is advantageously not triggered.

According to one embodiment, if it is detected that the touch-sensitive operator control unit is additionally touched by at least one further object, and the detected duration corresponds at least to the predetermined duration and/or the detected distance corresponds at least to the predetermined distance, a gesture operator control mode is predefined as the operator control mode, in which it is detected that the objects are made to sweep over the touch-sensitive operator control unit, and if the sweeping over corresponds to at least one predefined gesture a function of the motor vehicle which is assigned to the gesture is triggered. During the gesture operator control mode, the user can therefore swipe over the touch-sensitive operator control unit with more than one object and in the process control functions by using the objects to carry out a predetermined gesture on the touch-sensitive operator control unit. Such a function can be, for example, zooming into a screen content which is represented on a screen of the motor vehicle. In order to trigger this function, the user can carry out a so-called "pinch-to-zoom" gesture as the predetermined gesture on the touch-sensitive operator control unit, during which gesture the user places two objects on the touch-sensitive operator control unit and moves the two objects away from one another in opposite directions so that a distance between the objects increases. Such a gesture which is carried out by the user is detected as the "pinch-to-zoom" gesture by the touch-sensitive operator control unit, and subsequently the zooming of the screen content is carried out. In order to prevent an undesired function being inadvertently triggered if the user presses on the touch-sensitive operator control unit while carrying out a gesture, the second increased pressure value is predefined as the pressure threshold value.

The operator control device for a motor vehicle described herein has a touch-sensitive operator control unit which is configured to detect a duration during which the touch-sensitive operator control unit is touched by an object, to detect a distance which is traversed by the object when the touch-sensitive operator control unit is touched, and to detect a current position at which the touch-sensitive operator control unit is touched by the object. Furthermore, the operator control device includes a detection device which is configured to detect a pressure which is applied to the touch-sensitive operator control unit by touching the touch-sensitive operator control unit and a control device which is configured to predefine an operator control mode as a function of the detected duration and/or the detected distance, to predefine a pressure threshold value as a function of the predefined operator control mode, to determine whether the detected pressure is higher than the predefined pressure threshold value, and to trigger a function of the motor vehicle which is assigned to the detected current position, only if the detected pressure is higher than the predefined pressure threshold value. The detection device can include, for example, a pressure sensor. The control device can also be a control unit of the motor vehicle which is configured to communicate with the detection device and/or the touch-sensitive operator control unit.

The touch-sensitive operator control unit may have a first operator control area having at least one touch-sensitive control button and an adjoining second touch-sensitive operator control area, wherein the at least one touch-sensitive control button can be activated by pressing with a pressure which is higher than the predefined pressure threshold value, and if it has been detected by the control device that the object has touched the touch-sensitive operator control unit at least for a predetermined duration and/or the object has traversed at least a predetermined distance on the touch-sensitive operator control unit, the at least one touch-sensitive control button can be swept over in order to import alphanumeric characters and/or predetermined gestures.

The at least one control button can be embodied, for example, as a switching key or a so-called preset key which is arranged at a defined position in the first operator control area and to which a defined function is assigned. This defined function can be triggered by the user activating the switching key by pressing with a pressure which is higher than the pressure threshold value. Such a preset key can be, for example, a menu key by which a menu situation can be called on the display unit as the assigned function, or a "back" key with which a menu situation which is represented, for example, on the display unit can be exited. The second operator control area can be operated, for example, as a touchpad which is known per se. For this purpose, for example alphanumeric characters can be input on the second operator control area or the touchpad with the object in a character input mode or, for example, predefined gestures can be carried out with a plurality of objects in a gesture operator control mode. In this context there is provision that the touch-sensitive operator control unit can be swept over and operated in a way which encompasses multiple operator control areas during the gesture operator control mode or during the character input mode. It is therefore additionally possible for the first operator control area and therefore the at least one control button to be swept over or written on in order to carry out the gesture or to write the alphanumeric character if the pressure applied during the sweeping over does not exceed the pressure threshold value. However, if the user would like to activate the at least one control button, he can exert a pressure which is higher than the pressure threshold value on the at least one control button at any time, that is to say during the character input mode or the gesture operator control mode.

The motor vehicle includes the operator control device or an advantageous embodiment of the operator control device. The motor vehicle may, for example, be a passenger car.

The embodiments which are presented with respect to the method and the advantages thereof apply correspondingly to the operator control device and to the motor vehicle, wherein the operator control device is able to carry out the method.

BRIEF DESCRIPTION OF THE DRAWINGS

These and other aspects and advantages will be explained in more detail on the basis of exemplary embodiments and also with reference to the accompanying drawings, in which.

DETAILED DESCRIPTION OF THE PREFERRED EMBODIMENT

Reference will now be made in detail to the preferred embodiments, examples of which are illustrated in the accompanying drawings, wherein like reference numerals refer to like elements throughout.

In the exemplary embodiment explained below, the described components of the embodiment respectively present individual features of the invention which are to be considered independently of one another and which each also develop the invention independently of one another, and are therefore also to be considered part of the invention either individually or in another combination than that shown. Furthermore, the described embodiment can also be supplemented by further features of the invention which have already been described.

Figure 1:
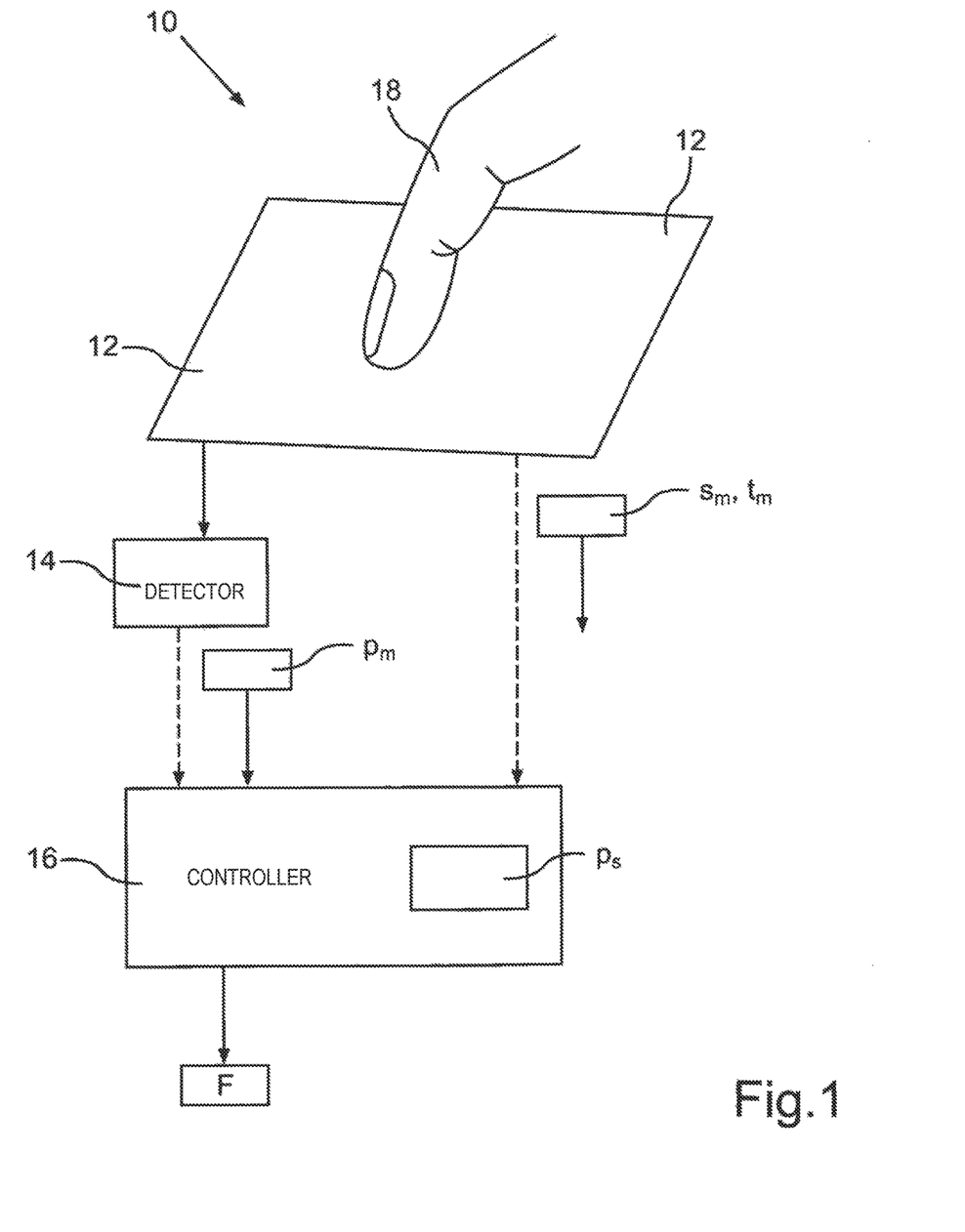
FIG. 1 is a perspective and block diagram of an embodiment of an operator control device.

FIG. 1 shows an operator control device 10 for selecting and/or triggering and/or controlling functions F of a motor vehicle (not illustrated here). Such functions F can relate, for example, to a navigation system of the motor vehicle, to a multimedia device, to an infotainment system, to what is referred to as a car menu which can be represented on a display unit (not shown here) of the motor vehicle, or to a hands free device of the motor vehicle.

The operator control device 10 can be provided, for example, in a center console so that it can easily be operated, in particular, by a driver of the motor vehicle. The operator control device 10 has here a touch-sensitive operator control unit 12, a detection device 14 and a control device 16. The detection device 14 can be configured, for example, as a pressure sensor which is known per se. The control device 16 can also be a control unit of the motor vehicle which is configured to communicate with the touch-sensitive operator control unit 12 and/or with the detection device 14 of the operator control device 10.

The operator control device 10 is operated with a finger 18 of a user, in particular of the driver of the motor vehicle, as a contact-making object.

The touch-sensitive operator control unit 12 is configured to detect a distance $s_m$ which is traversed by the finger 18 during the touching of the touch-sensitive operator control unit 12, and to detect a duration $t_m$ over which the touch-sensitive operator control unit 12 is touched with the finger 18. The distance $s_m$ and/or the duration $t_m$ are made available to the control device 16. Furthermore, the touch-sensitive operator control unit 12 is configured to detect a current position at which the touch-sensitive operator control unit 12 is touched with the finger 18. This may be carried out, for example, by measuring a capacitance of a capacitor which the finger 18 forms with the touch-sensitive operator control unit 12 at the position.

The detection device 14 is configured to detect a pressure $p_m$ which the finger 18 exerts or applies on the touch-sensitive operator control unit 12. This pressure $p_m$ which is detected by the detection device 14 is made available to the control device 16.

The control device 16 is configured to predefine an operator control mode of the operator control device 10 as a function of the detected duration $t_m$ and/or the detected distance $s_m$. The control device 16 determines a pressure threshold value $p_s$ as a function of this predefined operator control mode. The control device 16 compares the pressure $p_m$ detected by the detection device 14 with the currently predefined pressure threshold value $p_s$. If the detected pressure $p_m$ exceeds the pressure threshold value $p_s$, the control device 16 is configured to select and/or trigger and/or control the function F. The function F is therefore selected and/or triggered and/or controlled only if the finger 18 exerts, during the operator control of the operator control device 10 or the touch-sensitive operator control unit 12, a pressure $p_m$ on the touch-sensitive operator control unit 12 which exceeds the pressure threshold value $p_s$, that is to say a triggering threshold.

Figure 2:
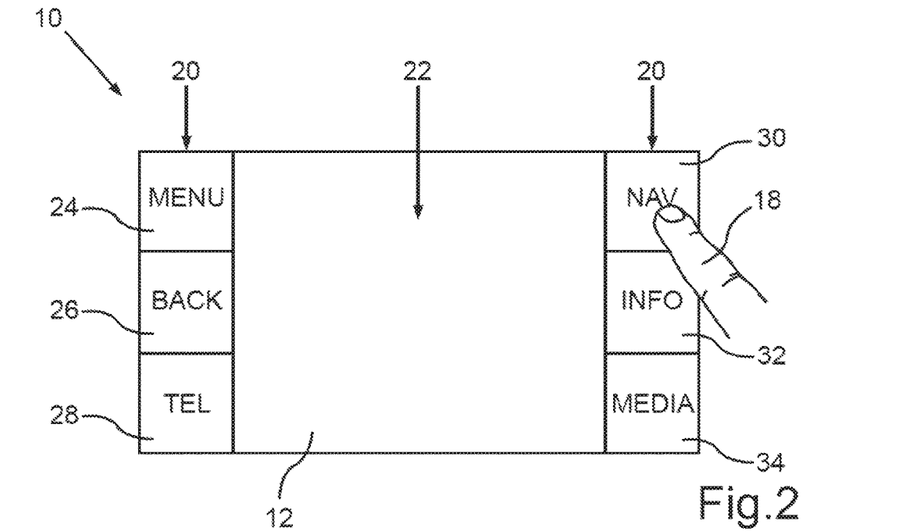
FIG. 2 is a schematic illustration of a further embodiment of an operator control device.

FIG. 2 shows a further embodiment of an operator control device 10. The operator control device 10 has here a first operator control area 20 and a second operator control area 22, wherein the second operator control area 20 is embodied adjacent to the first operator control area 20. The first operator control area 20 has here in total six control buttons 24 to 34 which are embodied here as pushbutton switches. Each of the control buttons 24 to 34 is respectively assigned a defined function F which can be triggered by pressing the respective control button 24 to 34 with a pressure $p_m$ which is higher than the pressure threshold value $p_s$. A first control button 24 is configured here as a menu key by which a menu can be called up on a screen (not illustrated here) of the motor vehicle. A second control button 26 is configured here as a so-called "back" key by which, for example, a menu situation which is displayed on the screen of the motor vehicle can be exited. By activating a third control button 28, a cellphone can be called up, and by activating a fourth control button 30 a navigation system of the motor vehicle can be called up. A fifth control button 32 serves to display information, and a sixth control button 34 serves to call up entertainment functions. The control buttons 24 to 34 which are illustrated here, and their assigned functions F, are merely by way of example and are not conclusive. The second operator control area 22 is embodied here as a coherent operator control area which can be used as a touchpad which is known per se.

In the exemplary embodiment shown here, the user would like to select the navigation system. To do this, the user touches with his finger 18 the control button 30 assigned to the navigation system and exerts a pressure $p_m$ on the control button 30, which pressure is detected by the detection device 14. The touch-sensitive operator control unit 12 detects a distance $s_m$ which the finger 18 traverses on the touch-sensitive operator control unit 12 and/or a duration $t_m$ over which the touch-sensitive operator control unit 12 is touched by the finger 18. The control device 16 compares the detected distance $s_m$ and/or the detected duration $t_m$ with a predetermined distance and/or duration. Here, the user touches the control button 30 in a punctiform and direct fashion, that is to say without previously having swept over the touch-sensitive operator control unit 12. This means that the finger 18 does not essentially traverse any distance $s_m$ on the touch-sensitive operator control unit 12 and touches the touch-sensitive operator control unit 12 only briefly. The operator control device 10, in particular the control device 16, detects that the driver would like to activate the control button 30 and predefines a first pressure value as the pressure threshold value $p_s$. The first pressure value can be approximately 3 N here. If the pressure $p_m$ detected by the detection device 14 is higher than the pressure threshold value $p_s$, as the function F assigned to the control button 30 triggered, that is to say here the navigation system selected or activated.

Figure 3:
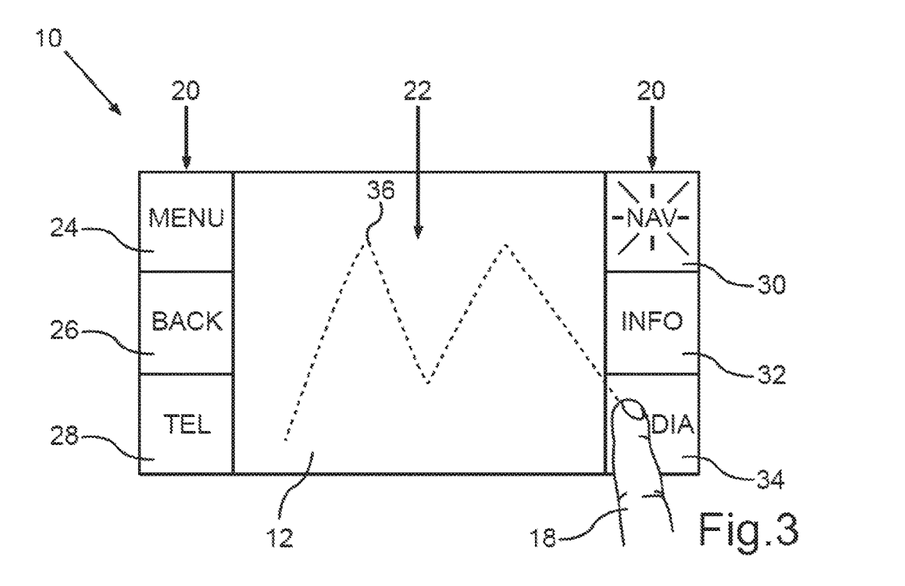
FIG. 3 is a schematic front view of an embodiment of an operator control device in a character input mode.

FIG. 3 shows the embodiment of the operator control device 10 from FIG. 2. The user has selected or activated the navigation system here by pressing the associated control button 30 with a pressure $p_m$ which is higher than the predefined pressure threshold value $p_s$. In this exemplary embodiment, the user would like to make a destination input for the navigation system. To do this, the user uses his finger 18 to write a letter 36, for example the letter "M", on the touch-sensitive operator control unit 12. The letter "M" can be, for example, the first letter of the destination to which the driver would like to navigate with the motor vehicle. In order to write the letter 36, the user can use the touch-sensitive operator control unit 12 in a way which encompasses multiple operator control areas, i.e. he can use his finger 18 to sweep both over the first operator control area 20, having the control buttons 24 to 34, and over the second operator control area 22.

The touch-sensitive operator control unit 12 detects a distance $s_m$ which the finger 18 traverses during the writing of the letter 36 on the touch-sensitive operator control unit 12 and/or a duration $t_m$ for which the finger 18 stays on the touch-sensitive operator control unit 12 during the writing. The control device 16 detects that the user is making a character input and makes available a character input mode. In addition, the control device 16 predefines a second pressure value, corresponding to the character input mode, as the pressure threshold value $p_s$. The second pressure value is selected here to be higher than the first pressure value according to the exemplary embodiment from FIG. 2 and can be, for example, approximately 5 N. Therefore it is possible, for example, to prevent the user from inadvertently activating one of the control buttons 24 to 34 while he sweeps over the first operator control area 20 in order to write the letter 38. However, if he nevertheless would like to trigger a function F which is assigned to the control buttons 24 to 34 he can activate with the finger 18 the corresponding control button 24 to 34 by pressing with a pressure $p_m$ which is higher than the second pressure value.

It is also possible to provide that the user would like to trigger a further function during the character input mode. This function can be, for example, the selection of a destination which is proposed on a screen of the motor vehicle after the touch-sensitive operator control unit 12 has recognized the letter 36. In order to select the proposed destination, the user can press with the finger 18 on the second operator control area 22, for example. Since the operator control device 10 is in the character input mode, the user has to exert a pressure $p_m$ which is higher than the second pressure value on the second operator control area 22. However, there may be provision that the user continues the destination input by briefly stopping the finger 18 and starting again in order to write further letters on the touch-sensitive operator control unit 12. During the stopping and restarting, the operator control device 10 may remain in the character input mode.

Figure 4:
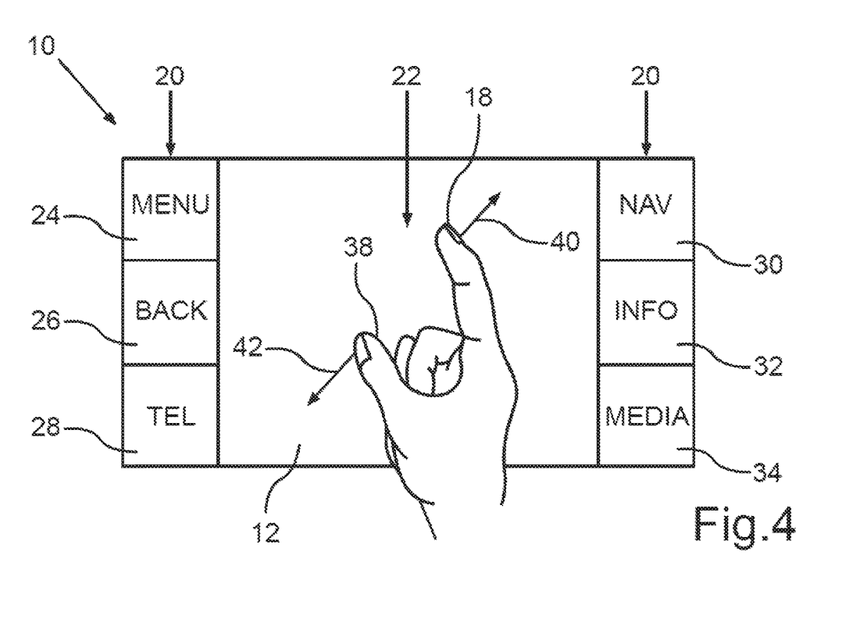
FIG. 4 is a schematic front view of an embodiment of an operator control device in a gesture operator control mode.

FIG. 4 shows the embodiment of the operator control device 10 from FIGS. 2 and 3. The user has selected or activated the navigation system here by pressing the associated control button 30 with a pressure $p_m$ which is higher than the predefined pressure threshold value $p_s$. In this exemplary embodiment, the user would like to enlarge a map of the surroundings which is presented on a screen (not shown here). To do this, the user carries out a gesture on the touch-sensitive operator control unit 12 which corresponds to a predetermined gesture. Here, the user carries out a so-called "pinch-to-zoom" gesture by which the map of the surroundings can be enlarged. To do this, the user places, for example, his thumb 38 on the touch-sensitive operator control unit 12 in addition to the finger 18 and moves the finger 18 in the direction of the arrow 40 and the thumb 38 in the direction of the arrow 42. The finger 18 and the thumb 38 therefore move away from one another in opposite directions on the touch-sensitive operator control unit 12. The operator control device 10, in particular the control device 16, detects the moving apart of the finger 18 and of the thumb 38 as the predetermined "pinch-to-zoom" gesture and enlarges the map of the surroundings on the screen.

While the gesture is being carried out, the finger 18 traverses a distance $s_m$ on the touch-sensitive operator control unit 12 and/or stays on the touch-sensitive operator control unit 12 for a duration $t_m$, which is detected by the touch-sensitive operator control unit 12. The control device 16 predefines a gesture operator control mode, and a pressure threshold value $p_s$ corresponding to the gesture operator control mode, on the basis of the detected duration $t_m$ and/or the detected distance $s_m$ as well as on the basis of the detected thumb 38 as a further contact-making object. In this context, the second pressure value which has already been predefined in conjunction with the character input mode can be predefined as the pressure threshold value $p_s$. It is therefore possible to prevent an undesired function F from being triggered if during the execution of the gesture the user inadvertently exerts a pressure which, for example, would have already triggered the function in the exemplary embodiment according to FIG. 2.

During the gesture operator control the touch-sensitive operator control unit 12 can also be swept over in a way which encompasses multiple operator control areas. In this way, the control buttons 24 to 34 can also be swept over in order to carry out the gesture. In order to trigger a function F which is assigned to the control buttons 24 to 34, the user must apply a pressure $p_m$ which is higher than the second pressure value to the corresponding control button 24 to 34.

The exemplary embodiment of the operator control of a navigation system shown in FIGS. 2 to 4 is merely by way of example. Likewise, other functions of the motor vehicle, for example infotainment components or a cellphone can be controlled or operated in an analogous fashion.

A description has been provided with particular reference to preferred embodiments thereof and examples, but it will be understood that variations and modifications can be effected within the spirit and scope of the claims which may include the phrase "at least one of A, B and C" as an alternative expression that means one or more of A, B and C may be used, contrary to the holding in *Superguide* v. *DIRECTV,* 358 F3d 870, 69 USPQ2d 1865 (Fed. Cir. 2004).

The invention claimed is:

1. A method for operating an operator control device of a motor vehicle, comprising:
    detecting at least one of a duration over which a touch-sensitive operator control unit is touched by an object and a distance traversed by the object when the touch-sensitive operator control unit is touched;
    detecting a current position at which the touch-sensitive operator control unit, operated in a predefined operator control mode, is touched by the object;
    detecting a pressure applied to the touch-sensitive operator control unit when the touch-sensitive operator control unit is touched;
    determining whether the pressure detected is higher than a pressure threshold value; and
    triggering a function of the motor vehicle assigned to the current position that can be triggered by punctiform touching and pressing of the touch-sensitive operator control unit at the current position, exclusively if the pressure detected is higher than the pressure threshold value;
    automatically selecting one of at least two operator control modes as a current operator control mode based on a function of at least one of the duration and the distance detected by said detecting;
    setting the pressure threshold value as a function of the current operator control mode, by setting the pressure threshold value to a first pressure value upon determination that the duration detected undershoots a predetermined duration or the distance detected undershoots a predetermined distance, and a second pressure value upon determination that the duration detected is at least the predetermined duration or the distance detected is at least the predetermined distance, said automatically selecting including, when the touch-sensitive operator control unit is touched only by the object, and said detecting detects at least the predetermined duration or at least the predetermined distance, selecting a character input mode as the current operator control mode, in which said detecting detects the object sweeping over the touch-sensitive operator control unit and at least one alphanumeric character is input as a function thereof; and when the touch-sensitive operator control unit is touched by at least two objects, and said detecting detects at least the predetermined duration or at least the predetermined distance, selecting a gesture operator control mode as the current operator control mode, in which said detecting detects the objects sweeping over the touch-sensitive operator control unit and when at least one predefined gesture is detected, a function of the motor vehicle assigned to the at least one predefined gesture is triggered.

2. The method as claimed in claim 1, further comprising maintaining the character input mode for a predefined duration after detection that the object is no longer touching the touch-sensitive operator control unit.

3. An operator control device for a motor vehicle, comprising:

a touch-sensitive operator control unit configured to detect a duration during which the touch-sensitive operator control unit is touched by an object, to detect a distance traversed by the object when the touch-sensitive operator control unit is touched, and to detect a current position at which the touch-sensitive operator control unit is touched by the object;

a detection device configured to detect a pressure applied to the touch-sensitive operator control unit by touching the touch-sensitive operator control unit;

a control device configured
  to determine whether the pressure detected is higher than a pressure threshold value,
  to trigger a function, assigned to the current position, by punctiform touching and pressing of the touch-sensitive operator control unit at the current position, only when the detected pressure is higher than the pressure threshold value
  to automatically select one of at least two operator control modes as a current operator control mode based on a function of at least one of the duration and the distance detected by said detection device,
  to set the pressure threshold value as a function of the current operator control mode, as one of
    a first pressure value when either the duration detected undershoots a predetermined duration or the distance detected undershoots a predetermined distance, and
    a second pressure value when either the duration detected is at least the predetermined duration or the distance detected is at least the predetermined distance,
  to select a character input mode as the current operator control mode, in which sweeping over the touch-sensitive operator control unit by the object can be detected, and at least one alphanumeric character is input as a function thereof, when the touch-sensitive operator control unit is touched only by the object and either the duration detected is at least the predetermined duration, or the distance detected is at least the predetermined distance; and to select a gesture operator control mode as the current operator control mode in which sweeping over the touch-sensitive operator control unit by at least two objects can be detected and when the sweeping over corresponds at least to a predefined gesture, to trigger a function of the motor vehicle assigned to the predefined gesture when the touch-sensitive operator control unit is touched with the at least two objects and either the duration detected is at least the predetermined duration, or the distance detected is at least the predetermined distance.

4. The operator control device as claimed in claim 3, wherein the touch-sensitive operator control unit includes a first operator control area having at least one touch-sensitive control button and an second touch-sensitive operator control area adjacent thereto, wherein the at least one touch-sensitive control button is activated when the pressure detected is higher than the pressure threshold value, and wherein when the control device detects at least one of the object has touched the touch-sensitive operator control unit at least for the predetermined duration and the object has traversed at least the predetermined distance on the touch-sensitive operator control unit, the at least one touch-sensitive control button can be swept over to input at least one of alphanumeric characters and predetermined gestures.

5. A motor vehicle, comprising:

a chassis; and an operator control device, including a touch-sensitive operator control unit configured to detect
  a duration during which the touch-sensitive operator control unit is touched by an object,
  a distance traversed by the object when the touch-sensitive operator control unit is touched, and
  a current position at which the touch-sensitive operator control unit is touched by the object;

a detection device configured to detect a pressure applied to the touch-sensitive operator control unit by touching the touch-sensitive operator control unit;

a control device configured to
  automatically select one of at least two operator control modes as a current operator control mode based on a function of at least one of the duration and the distance detected by said detection device, the at least two operator control modes including
    a character input mode in which sweeping over the touch-sensitive operator control unit by the object can be detected, and at least one alphanumeric character is input as a function thereof, the character input mode being selected when the touch-sensitive operator control unit is touched only by the object and either the duration detected is at least the predetermined duration, or the distance detected is at least a predetermined distance; and
    a gesture operator control mode in which sweeping over the touch-sensitive operator control unit by at least two objects can be detected and when the sweeping over corresponds at least to a predefined gesture, to trigger a function of the motor vehicle assigned to the predefined gesture when the touch-sensitive operator control unit is touched with the at least two objects and either the duration detected is at least the predetermined durations, or the distance detected is at least the predetermined distance, set a pressure threshold value as a function of the current operator control mode, as one of
   a first pressure value when either the duration detected undershoots a predetermined duration or the distance detected undershoots the predetermined distance, and
   a second pressure value when either the duration detected is at least the predetermined duration or the distance detected is at least the predetermined distance, determine whether the pressure detected is higher than the pressure threshold value, trigger a function, assigned to the current position, by punctiform touching and pressing of the touch-sensitive operator control unit at the current position, only when the detected pressure is higher than the pressure threshold value.

6. The motor vehicle as claimed in claim 5,
wherein the touch-sensitive operator control unit includes a first operator control area having at least one touch-sensitive control button and an second touch-sensitive operator control area adjacent thereto,
wherein the at least one touch-sensitive control button is activated when the pressure detected is higher than the pressure threshold value, and
wherein when the control device detects at least one of the object has touched the touch-sensitive operator control unit at least for the predetermined duration and the object has traversed at least the predetermined distance on the touch-sensitive operator control unit, the at least one touch-sensitive control button can be swept over to input at least one of alphanumeric characters and predetermined gestures.

* * * * *

UNITED STATES PATENT AND TRADEMARK OFFICE
CERTIFICATE OF CORRECTION

PATENT NO. : 10,146,432 B2
APPLICATION NO. : 15/537285
DATED : December 4, 2018
INVENTOR(S) : Ulrich Mueller et al.

Page 1 of 1

It is certified that error appears in the above-identified patent and that said Letters Patent is hereby corrected as shown below:

In the Claims

Column 10, Line 63:
In Claim 1, delete "mode," and insert -- mode --, therefor.

Column 13, Line 3:
In Claim 5, delete "durations," and insert -- duration, --, therefor.

Signed and Sealed this
Twenty-ninth Day of January, 2019

Andrei Iancu
*Director of the United States Patent and Trademark Office*